No. 788,983. PATENTED MAY 2, 1905.
R. WRIGHT.
ARMOR FOR PNEUMATIC TIRES.
APPLICATION FILED SEPT. 24, 1904.

Witnesses
F. A. Barron
M. A. Schmidt

Robert Wright, Inventor
by
Milo B. Stevens & Co. Attorneys

No. 788,983. Patented May 2, 1905.

UNITED STATES PATENT OFFICE.

ROBERT WRIGHT, OF CLEVELAND, OHIO.

ARMOR FOR PNEUMATIC TIRES.

SPECIFICATION forming part of Letters Patent No. 788,983, dated May 2, 1905.

Application filed September 24, 1904. Serial No. 225,815.

*To all whom it may concern:*

Be it known that I, ROBERT WRIGHT, a citizen of the United States, residing at Cleveland, in the county of Cuyahoga and State of Ohio, have invented new and useful Improvements in Armor for Pneumatic Tires, of which the following is a specification.

My invention relates to an armor for pneumatic tires, and has for its object to provide a simple and effective device to prevent puncture of the tire.

The invention consists in certain novel features of construction hereinafter described and claimed, reference being had to the drawings hereto annexed, in which—

Figure 1:
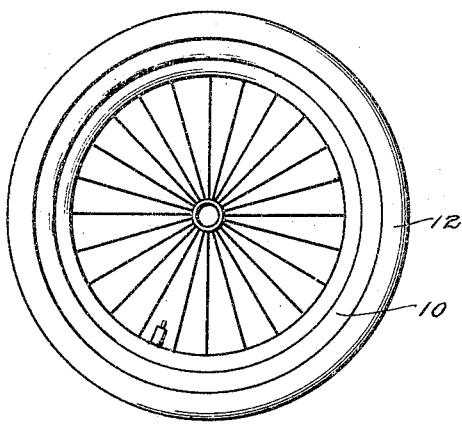
Figure 3:
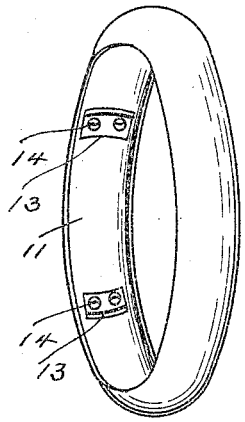
Figure 2:
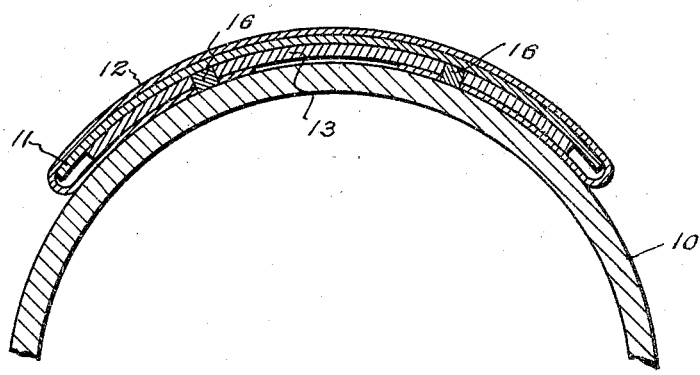
Figure 4:
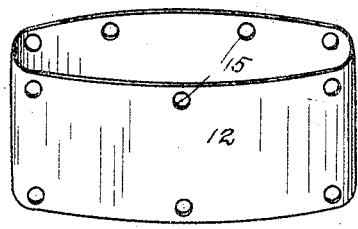
Figure 5:
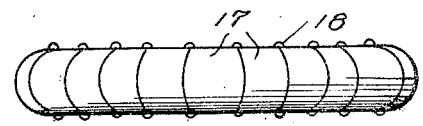

Figure 1 is an elevation of the tire with the invention applied thereto. Fig. 2 is an enlarged transverse section thereof. Fig. 3 is a perspective view of the armor, and Fig. 4 a like view of the cover therefor. Fig. 5 is a plan view of a modified form of armor.

Referring specifically to the drawings, 10 denotes a pneumatic tire, which may be of any ordinary construction, nothing being claimed with respect thereto. The armor is indicated at 11, and it comprises an annular metal band which extends around the periphery of the tire. The band is curved in cross-section and is of a width to cover the tread of the tire when it is inflated.

At 12 is indicated a cover which extends over the outside of the armor. Said cover is made of rubber or other suitable material, and it is fastened by extending its edges between the armor and the tire. The armor has on its inner side a number of perforated strips 13. Its perforations 14 register with perforations 15 made along the edges of the cover when the same is in place, and studs or buttons 16 on the tire extend into said perforations, whereby the parts are securely fastened together. The entire structure is thus fastened to the tire and is effectively prevented from "creeping." The cover can also be secured by being simply cemented to the armor, the edges being extended between the armor and the tire, as before. In this case the strips 13, studs 16, and perforations 15 are omitted.

In Fig. 5 a modified form of armor is shown, the same being made up or consisting in separate sections 17, which are hinged or joined, as at 18. This form of armor can be secured to the tire in the same manner as herein stated.

The armor will be of such a size that it will fit tightly on the tire when the latter expands on being inflated, whereby it will be securely held in place. It is further secured by the other fastening means above described. It is to be understood, of course, that the armor and its cover will be put on the tire when it is flat. The cover will be securely held in place as it is clamped between the armor and the tire in addition to the other fastening means already described.

Having thus described my invention, what I claim as new, and desire to secure by Letters Patent, is—

1. The combination with a pneumatic tire, of an armor therefor comprising a metal band extending around the periphery of the tire, and held in place by the expansion of the tire when the same is inflated; and a cover on the outside of the band, and having its edges extending between the band and the tire.

2. The combination with a pneumatic tire, of an armor therefor comprising a metal band extending around the periphery of the tire, and held in place by the expansion of the tire when the same is inflated; perforated strips secured to the inner side of the band; a cover extending over the outside of the band and between the band and the tire, said cover having perforations along its edges adapted to register with the perforations in the strips on the band; and studs on the tire extending into said registering perforations.

3. The combination with a pneumatic tire, of an armor therefor comprising a metal band made up of hinged sections extending around the periphery of the tire and held in place by the expansion thereof when it is inflated; and a cover on the outside of the band, said cover having its edges extending between the band and the tire.

In testimony whereof I have signed my name to this specification in the presence of two subscribing witnesses.

ROBERT WRIGHT.

Witnesses:
 JOHN A. BOMMHARDT,
 LOTTIE NEWBURN.